United States Patent [19]

Hesch

[11] Patent Number: 5,320,046
[45] Date of Patent: Jun. 14, 1994

[54] LOW PROFILE RAILWAY CAR

[75] Inventor: Harold E. Hesch, St. John, Ind.

[73] Assignee: Trinity Industries, Inc., Dallas, Tex.

[21] Appl. No.: 824,183

[22] Filed: Jan. 22, 1992

[51] Int. Cl.⁵ .................................................. B61F 1/00
[52] U.S. Cl. ..................................... 105/413; 105/418;
105/355; 213/50; 213/62 R
[58] Field of Search ................ 105/4.1, 4.4, 373, 4.2,
105/355, 416, 418, 413; 213/40 R, 50, 61, 56;
410/52, 71, 77, 82

[56] References Cited

U.S. PATENT DOCUMENTS

| 3,266,441 | 8/1966 | Pulcrano | 105/416 |
|---|---|---|---|
| 3,568,607 | 3/1971 | Gutridge | 410/71 |
| 4,589,558 | 5/1986 | Brodeur et al. | 105/3 |
| 4,626,155 | 12/1986 | Hlinsky et al. | 410/82 |
| 4,671,714 | 6/1987 | Bennett | 105/3 |
| 4,759,294 | 7/1988 | Schuller et al. | 410/71 |
| 4,917,019 | 4/1990 | Hesch et al. | 105/4.1 |
| 5,054,630 | 10/1991 | Altherr | 213/56 |
| 5,092,250 | 3/1992 | Halliar | 410/52 |

Primary Examiner—Mark T. Le
Attorney, Agent, or Firm—Baker & Botts

[57] ABSTRACT

The present invention provides a railway car for hauling stacked containers. The railway car comprises a coupler and draft assembly having a vertical dimension that is substantially reduced over conventional railway car systems. The reduced height of the coupler and draft assembly allow three tiers of containers to be stacked on the railway car without exceeding A.A.R. height requirements.

5 Claims, 8 Drawing Sheets

LOW PROFILE RAILWAY CAR

TECHNICAL FIELD OF THE INVENTION

This invention pertains to a railway car. More particularly, the invention relates to a railway car adapted for hauling stacked containers.

BACKGROUND OF INVENTION

With prior railway cars, bulky goods, such as vehicles, were strapped onto the flat railway car in a single level. The unprotected goods were subject to vandalism and theft. These conditions led to the development of auto-rack cars. In auto-rack cars, autos are stacked in two levels. The use of auto-rack cars increased the carrying capacity of railway cars. Furthermore, the goods were enclosed and thus protected.

The A.A.R. has established certain parameters relating to height, width, length, and weight of railway cars. These dimensions cannot be exceeded. For railway cars carrying goods in containers, the size of the containers must also be considered to determine if the railway car falls within the established parameters. The height requirement, in particular, has limited prior railway cars to a two tier arrangement of containers. A third tier could not be accommodated in prior railway cars because of clearance.

SUMMARY OF THE INVENTION

In accordance with the present invention, a low profile railway car is provided which substantially eliminates or reduces problems and disadvantages associated with prior railway cars.

According to the teachings of the present invention, a three tier arrangement of fully enclosed containers may be mounted on a flat railway car. Each container level may hold three autos thereby providing a total of nine autos per railway car.

A technical advantage of the present invention is that it provides a flat railway car with a reduced vertical dimension. The railway car comprises a main frame with a novel center sill. The vertical dimension of the center sill is reduced over a conventional car. This reduced vertical dimension lowers the frame top to permit a three tier arrangement of containers on the railway car.

It is another technical advantage of the present invention to provide a draft gear having a reduced height. The reduced height of the draft gear permits reducing the dimensions of the center sill and coupler assembly associated with the draft gear. In this manner, the main frame of the present invention may carry three tiers of containers and also comply with the A.A.R. height requirement.

BRIEF DESCRIPTION OF THE DRAWINGS

These and other objects and advantages inherent in and encompassed by the invention will become more apparent from the specification and drawings, wherein.

DETAILED DESCRIPTION OF THE INVENTION

Figure 1:
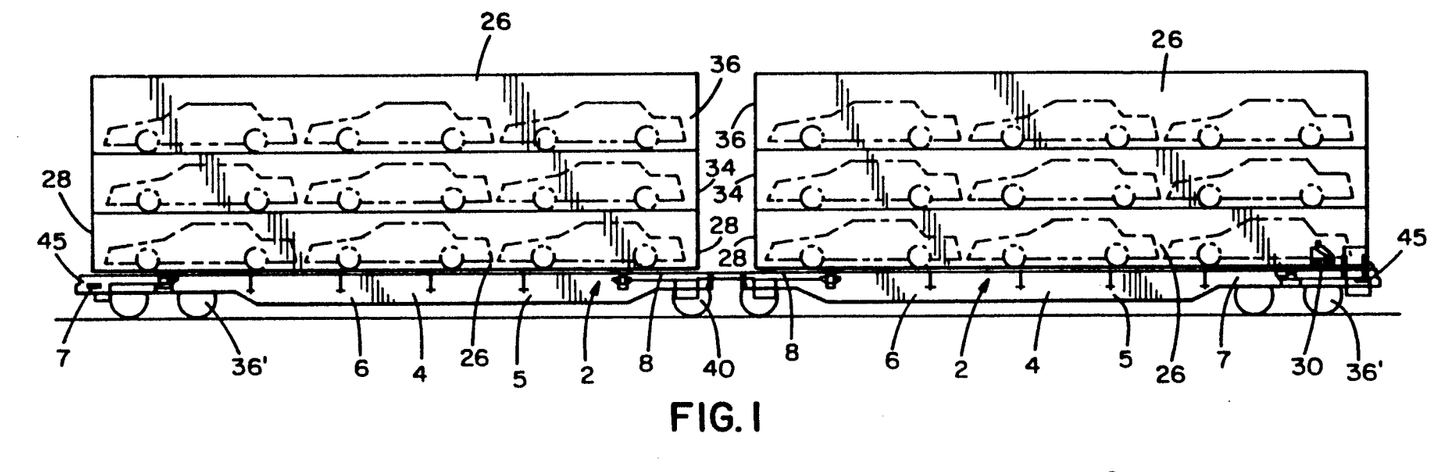
FIG. 1 is a side elevational view of a pair of railway cars constructed according to the teachings of the present invention.
Figure 2:
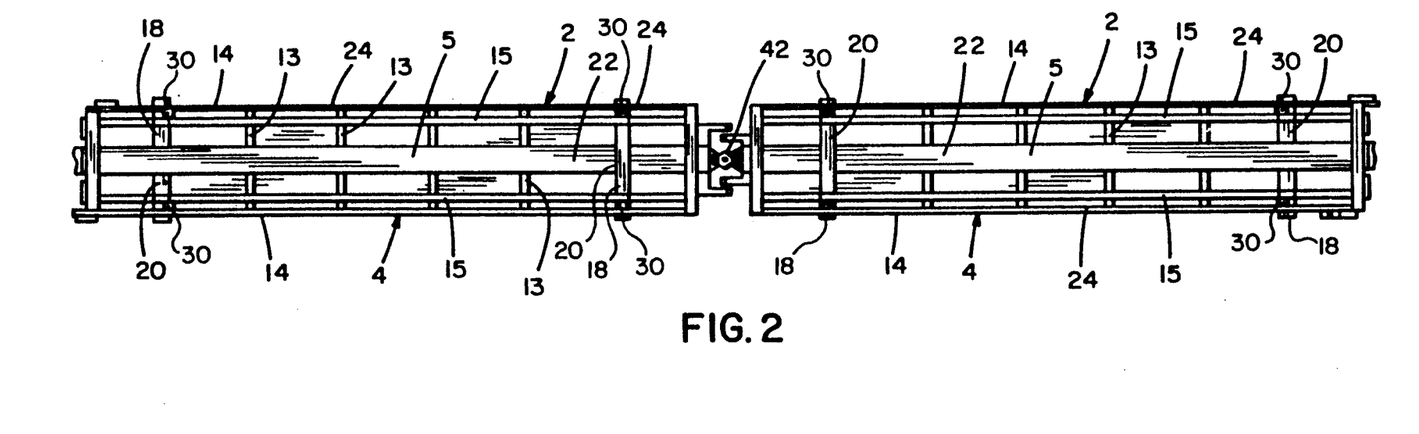
FIG. 2 is a top plan view of the structure shown in FIG. 1 with the containers removed.

FIGS. 1 and 2 illustrate two railway cars each indicated generally at 2. Each railway car 2 has a frame 4, including a longitudinal center sill 5. Each center sill 5 has a heavy, deep center section 6 and reduced, or relatively thin, end portions 7 and 8, respectively. Each railway car 2 is carried at the outer end by a truck 36'. The adjacent ends of two adjacent railway cars 2 are carried by a common truck 40. It will be understood that the invention is not limited to two railway cars, but can be used with any number of railway cars.

Each railway car 2 may mount three tiers of containers indicated generally at 26. For example, railway car 2 may mount bottom, intermediate, and top containers 28, 34 and 36, respectively as shown in FIG. 1. Containers 28, 34 and 36 may be interlocked with each other. Each corner of container 28 is secured to railway car 2 by conventional locks 30 as well known in the art.

Each railway car 2 comprises a frame 4. Frame 4 includes center sill 5, lateral cross-members 13, side sills 14, and longitudinal stringers 15. Lateral cross-members 13 extend from opposite sides of center sill 5. Lateral cross-members 13 connect to center sill 5 at one end. Lateral cross-members 13 also connect to side sills 14 and longitudinal stringers 15.

Frame 4 of each car further comprises transverse bolsters 18. Each transverse bolster 18 has a top surface 20. Center sill 5 has a top surface 22. Each side sill 14 also has a top surface 24. Top surfaces 18, 22, and 24 are substantially coplanar to provide seating for container 28.

In FIG. 1, railway cars 2 are interconnected by an articulated connector 42 such as shown and described in U.S. Pat. Nos. 4,917,019 and 4,782,762 which patents are incorporated in this application by reference and made part hereof.

The construction of center sill 5 of frame 4 allows railway car 2 to transport three tiers of containers 26. The end portions of center sill 5 may be shallow in comparison to conventional structures. For example, the end portions of center sill 5 may be about 50% more shallow than conventional structures. Center sill 5 houses a coupler 45 as shown in FIG. 1. Coupler 45 is operable to couple railway car 2 to an engine drive car, or another railway car having a type E coupler. Intermediate railway cars 2, if used, would all be coupled to each other by articulate connectors 42.

Figure 3:
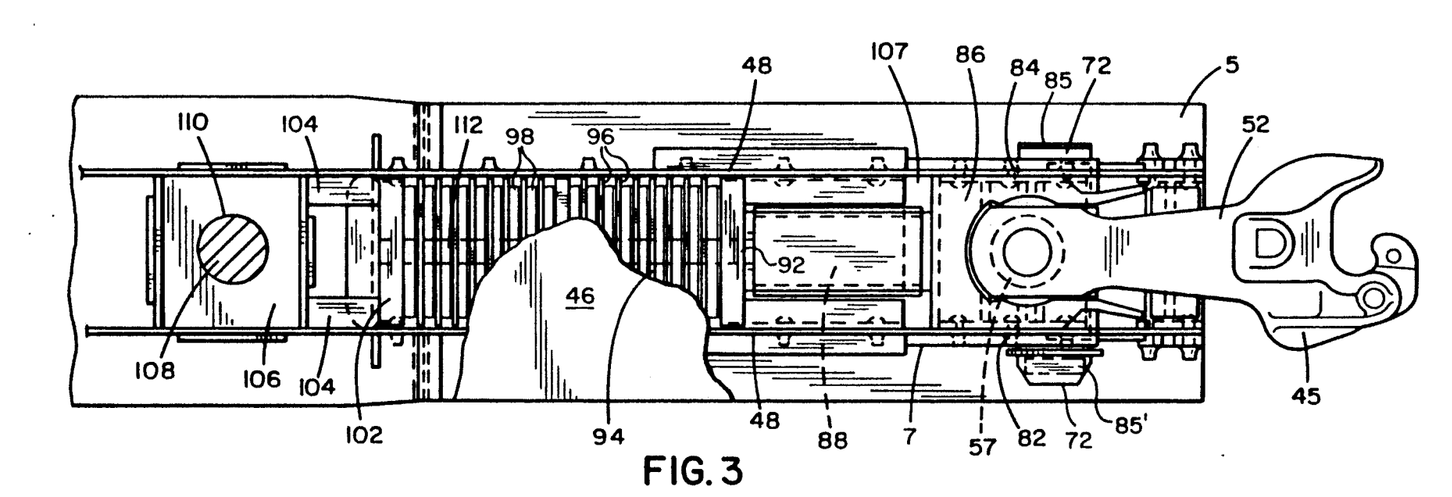
FIG. 3 is a top plan view partly in horizontal section showing a coupler and draft assembly constructed according to the teachings of the present invention.
Figure 4:
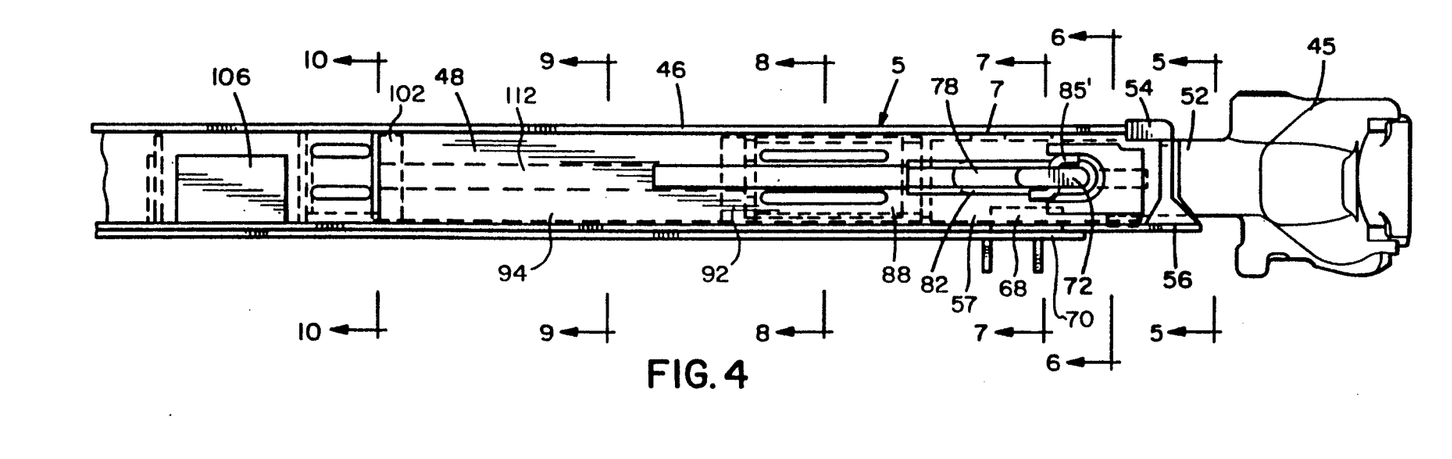
FIG. 4 is a side elevational view of the structure shown in FIG. 3.
Figure 5:
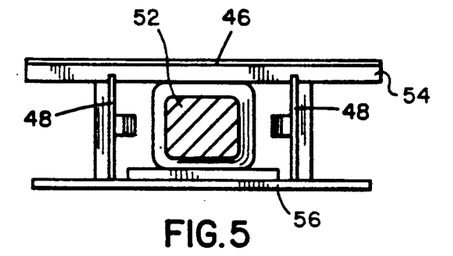
FIGS. 5 through 10 are cross-sectional views taken respectively on lines 5—5, 6—6, 7—7, 8—8, 9—9, and 10—10 of FIG. 4.
Figure 6:
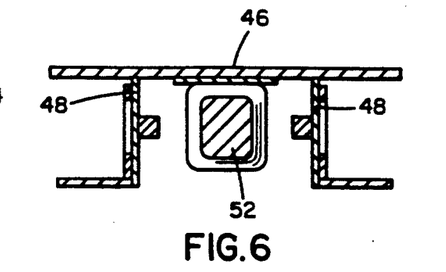

Center sill 5 is a main support member. Center sill 5 is preferably hat shaped in cross-section. Center sill 5 has a top wall 46 and side walls 48. Center sill 5 also may have flanges extending laterally from the lower edges of side walls 48, if such construction is required. As shown in FIGS. 3 and 4, thin portion 7 of center sill 5 houses coupler 45. Coupler 45 may comprise a type E coupler which is associated with a shock-free coupler system. In other words, coupler 45 has no movement when pulled by being biased outward and has a limited movement in buff.

Figure 7:
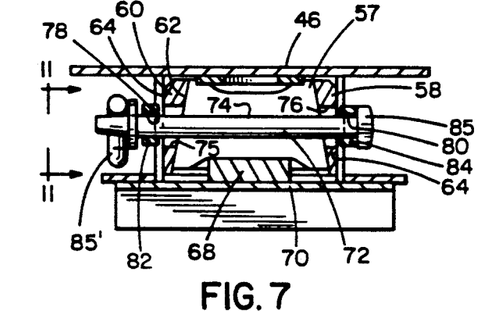

Coupler 45 has a connecting shank 52 which extends into thin portion 7 of center sill 5. Shank 52 is held in horizontal position between top and bottom strikers 54 and 56. The innermost portion of shank 52 is provided with a cone shaped bearing block 57. As shown in FIG. 7, bearing block 57 is flanked by a pair of wedges 58 and 60. Wedges 58 and 60 are disposed between surface 62 of bearing block 57 and surfaces 64 on opposing side wall 48 of center sill 5. Bearing block 57 is hollowed in its bottom and admits a wear block 68 therein as shown in FIG. 7. Block 68 is seated upon a support member 70 which is secured to side walls 48 of center sill 5.

Figures 9, 10, 11:
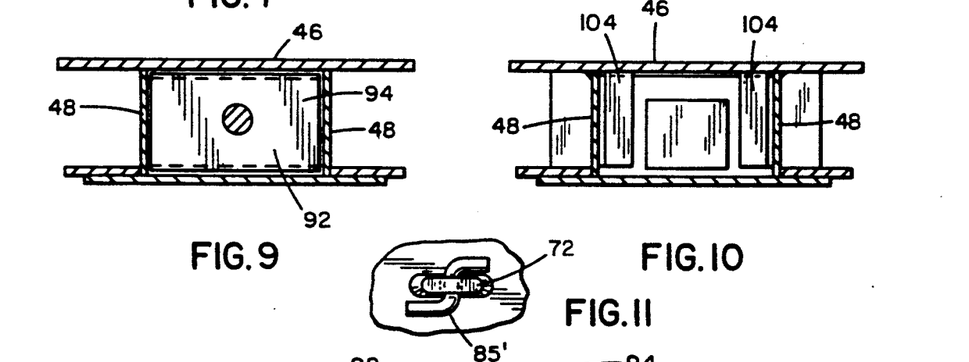
FIG. 11 is a side view of a key lock for use with a coupler and draft assembly constructed according to the teachings of the present invention.

Coupler 45 is maintained in center sill 5 by key 72. Key 72 extends through horizontal slot 74 in bearing block 57. Key 72 extends through laterally aligned slots 75 and 76 in the wedges 58 and 60. Finally, the ends of key 72 exit center sill 5 through horizontally elongated slots 78 and 80 in side walls 48 of center sill 5. Slots 78 and 80 are edged by reinforcement strips 82 and 84. Key 72 is maintained within slots 74, 75, 76, 78 and 80 by a head 85 at one end and an s-shaped pin 85' at the other end as seen in FIGS. 7 and 11. Slots 78 and 80 may be designed with a lateral length sufficient to allow a limited movement of coupler 45 in buff. This means that the lateral length of slots 78 and 80 may be longer than the width of Key 72 thereby allowing lateral movement of key 72 in slots 78 and 80. By biasing coupler 42 outward as described below, slots 74, 78 and 80 and key 72 provide for no movement in draft by key 72 positively engaging slots 72, 74 and 80 when coupler 45 is pulled.

Figure 8:
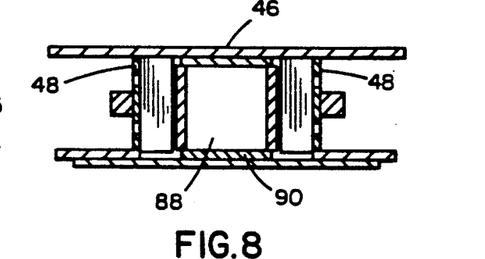
Figure 12:
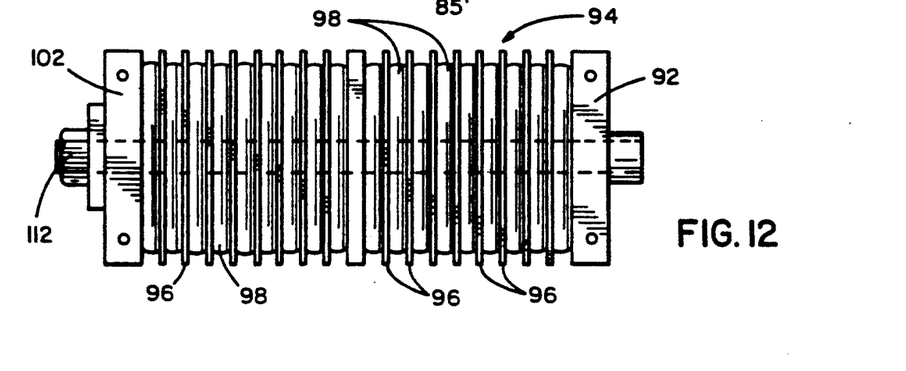
FIG. 12 is a side elevational view of a cushion block constructed according to the teachings of the present invention.

Coupler 45 may be biased outward in center sill 5 by bearing block 86, spacer block 88, cushion block 94 and stops 104. Bearing block 86 abuts the rear end of shank 52 of coupler 45. Bearing block 86 also abuts against one end of a solid spacer block 88. Spacer block 88 is supported on its bottom side by a reinforcing plate 90 secured to side walls 48 of the center sill 5 shown in FIG. 8. Spacer block 88 bears against a front plate 92 of cushion block 94. Cushion block 94 comprises a series of steel plates 96 with intervening pads 98 of elastomeric flexible material as shown in FIG. 12. Pads 98 are compressed between related plates 96 by compressive buffing loads being delivered to coupler 45. The extent of compressive movement is shown at 107 in FIG. 3. The rear end of the cushion block has a metal end plate 102. End plate 102 seats against stops 104. Stops 104 are welded to side walls 48 of center sill 5. Blocks 104 are interposed between cushion block 94 and center filler 106. A king pin 108 extends through a vertical opening 110 in filler assembly 106.

Cushion block 94 is held together by a bolt and nut assembly 112 and is compressed thereby for insertion into center sill 5. Assembly 112 is loosened to permit expansion into the space between stops 104 and spacer block 88. Once in place, cushion block 94 expands thereby biasing coupler 45 in an expanded position. Coupler 45 is maintained from exiting center sill 5 by key 72 passing through block 57 and side walls 48.

The orientation of coupler 45 in center sill 5 allows three tiers of containers 26 to be stacked on railway car 2 without exceeding the A.A.R. requirements. Coupler 45 operates by rotating in a horizontal, rather than vertical, plane. Additionally, the vertical dimension of coupler 45 is also less than its horizontal dimension. Furthermore, the top of shank 52 is in near contact with top wall 46 of center sill 5. All of these factors provide for a decrease in the vertical dimension of center sill 5. Consequently, three tiers of containers 26 may be stacked on a railway car 2 constructed according to the teachings of the present invention without exceeding the A.A.R. requirements.

Figure 13:
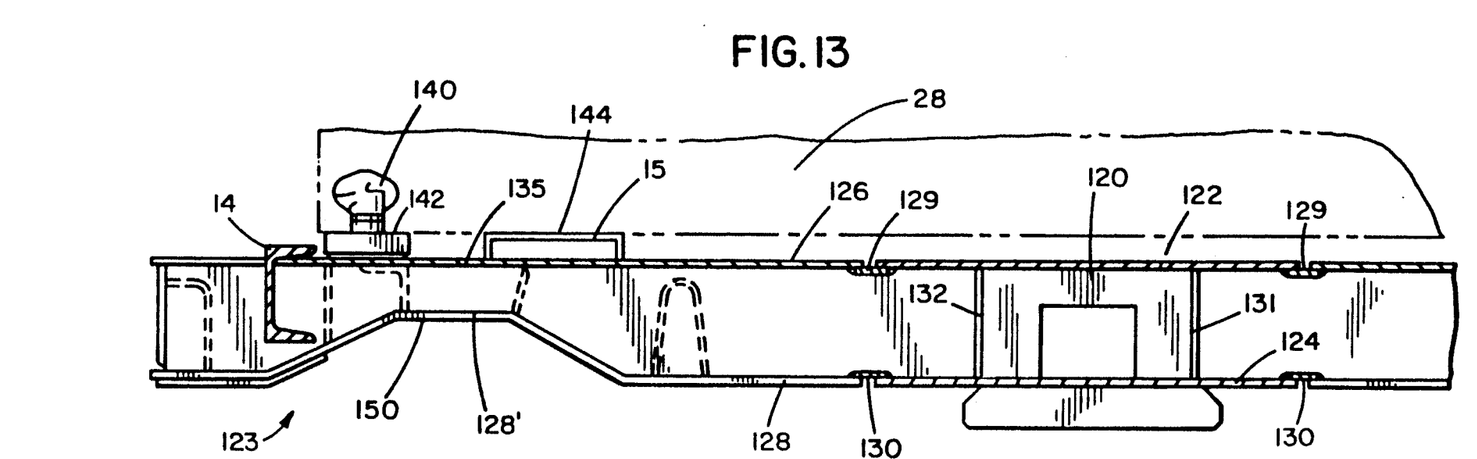
FIG. 13 is a longitudinal section of a bolster constructed according to the teachings of the present invention.

FIGS. 13 through 16 illustrate an embodiment of transverse bolster 18 indicated generally at 123 for use at an end of railway car 2 housing coupler 45. Bolster 123 is provided with a center plate 120 mounted between top and bottom walls 122 and 124. Top and bottom walls 122 and 124 are positioned substantially coplanar with top and bottom wall sections 126 and 128 of bolster 123. Top and bottom walls 122 and 124 are weld-connected with top and bottom wall sections 126 and 128, respectively, as shown in FIG. 13 at 129 and 130. Center plate 120 is positioned between side walls 131 and 132 of bolster 123. Top wall 126 continues in a common horizontal plane throughout end section 135 of Bolster 123. Bottom wall 128' is offset upwardly at end section 135 to provide wheel clearance pockets.

Figure 14:
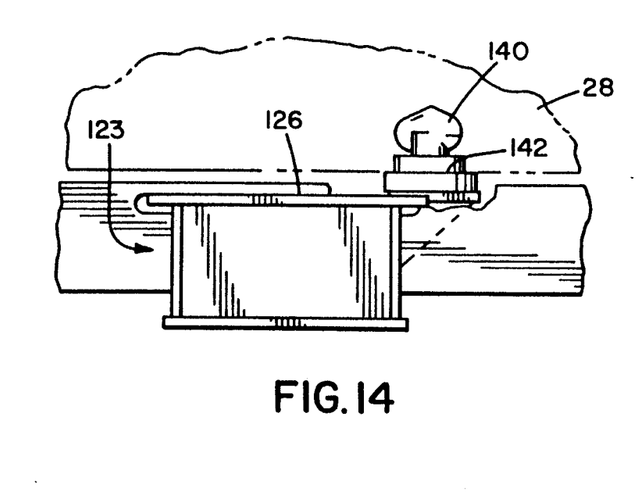
FIG. 14 is a fragmentary side elevation view of a frame taken on line 14—14 of FIG. 16.
Figure 15:
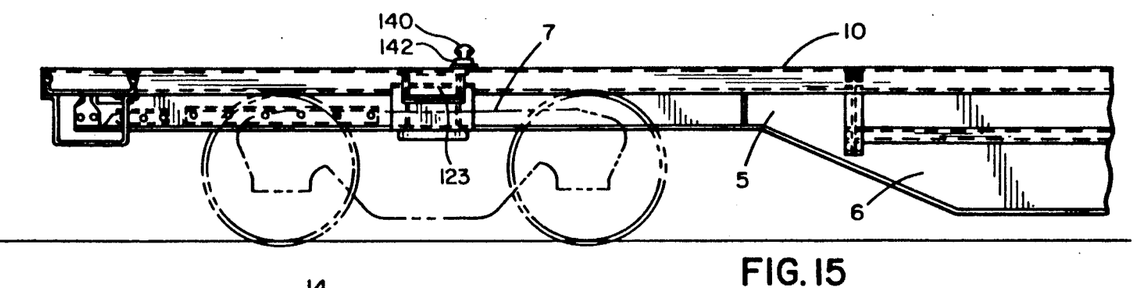
FIG. 15 is a fragmentary side elevation view of the railway car of FIG. 1.
Figure 16:
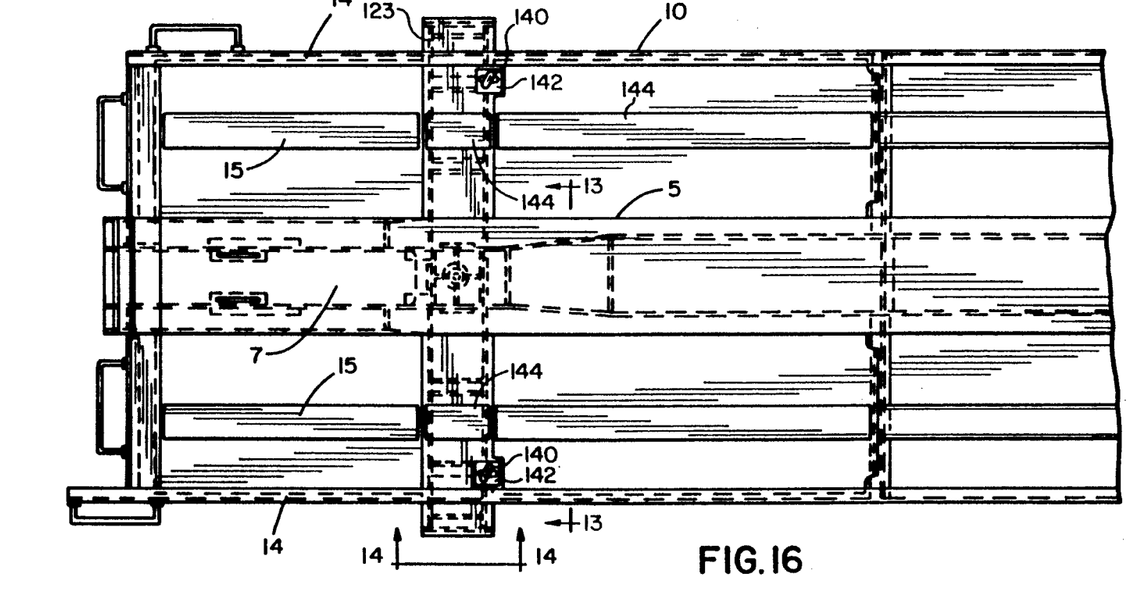
FIG. 16 is a plan view of the railway car of FIG. 15.
Figure 17:
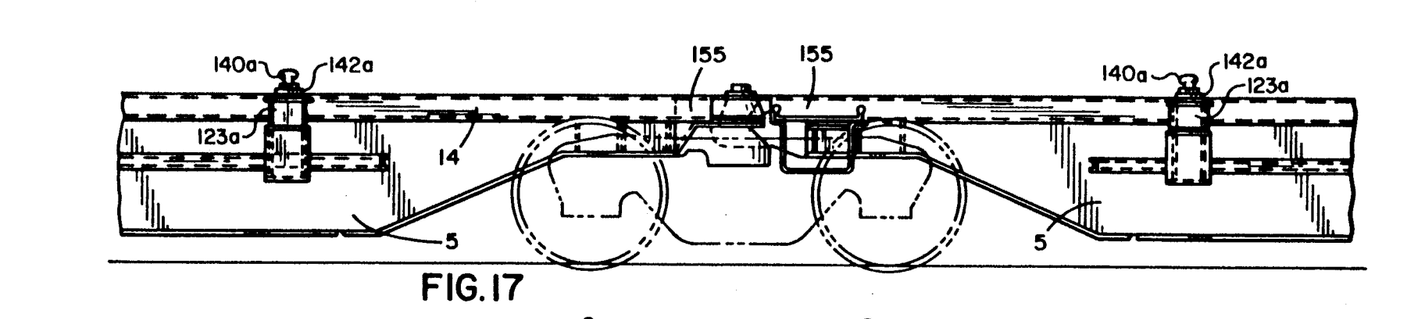
FIG. 17 is a fragmentary side elevation of two coupled railway cars constructed according to the teachings of the present invention.
Figure 18:
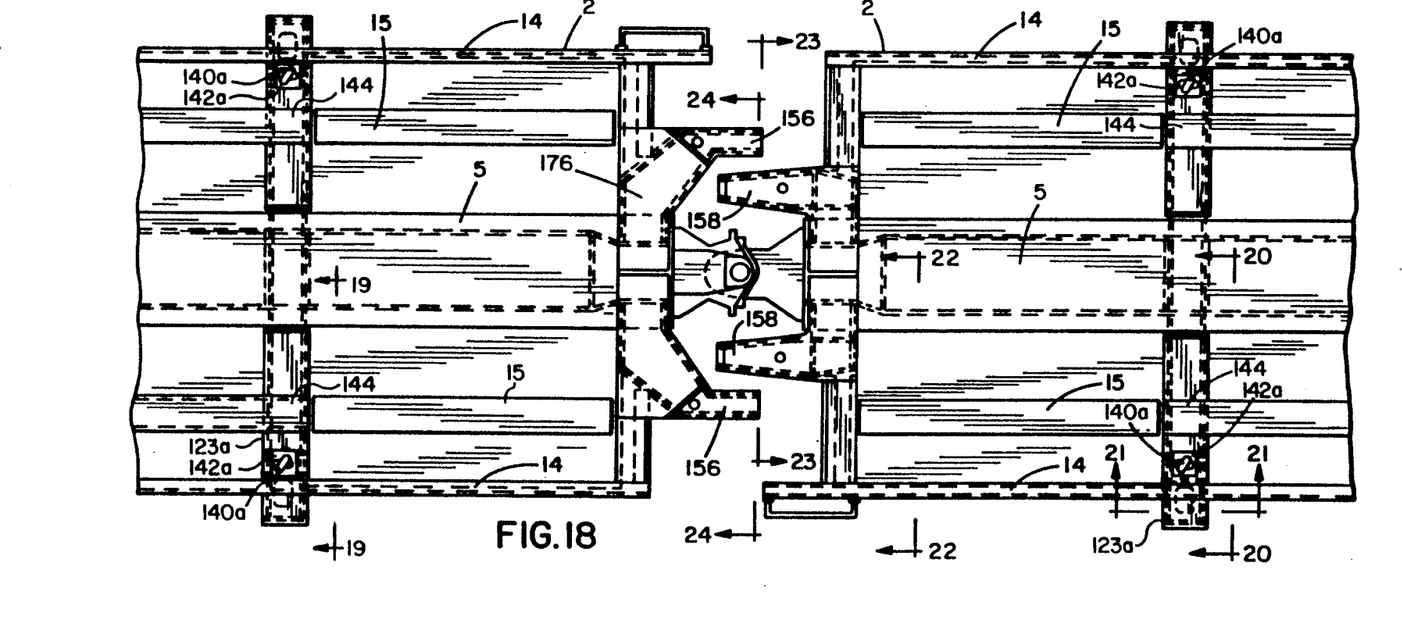
FIG. 18 is a top plan view of the structure shown in FIG. 17.

A seating surface 142 for the bottom of container 28 is provided on a conventional lock 140. Conventional lock 140 is mounted on top wall 126 of bolster 123. Lock 140 is arranged in offset relationship to bolster 123 as shown in FIG. 14. Surface 142 is coplanar with surface 144 on top of stringer 15.

Figure 20:
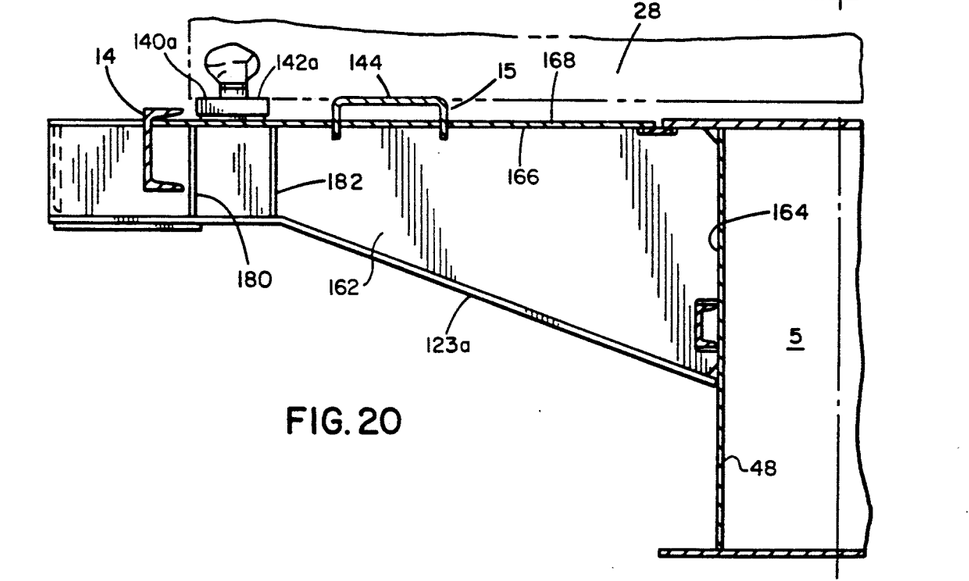
FIG. 20 is a cross-section taken on line 20—20 of FIG. 19.
Figure 21:
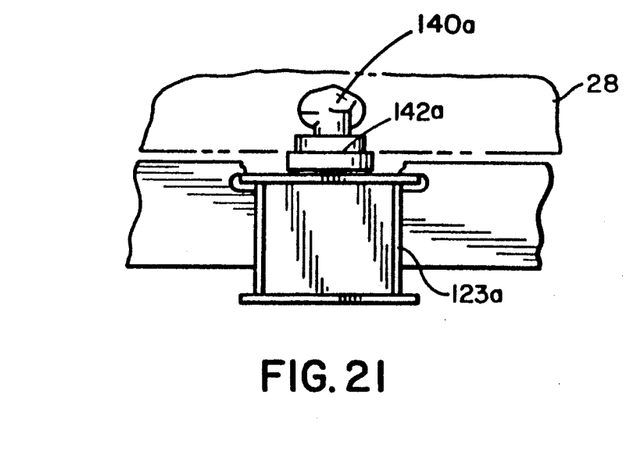
FIG. 21 is a cross-section taken substantially on line 21—21 of FIG. 18.
Figure 22:
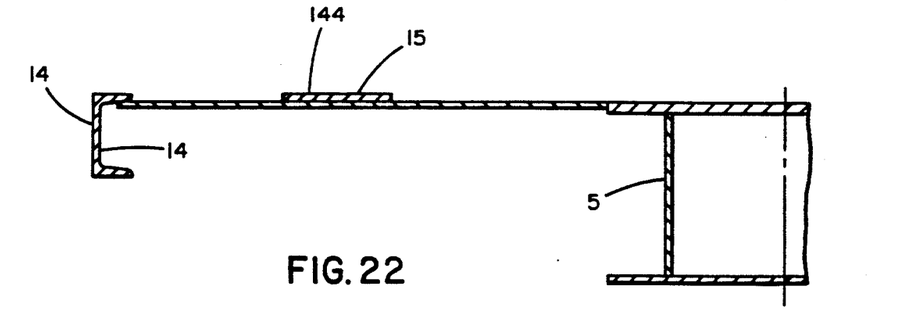
FIG. 22 is a cross-section taken substantially on line 22—22 of FIG. 18.
Figure 23:
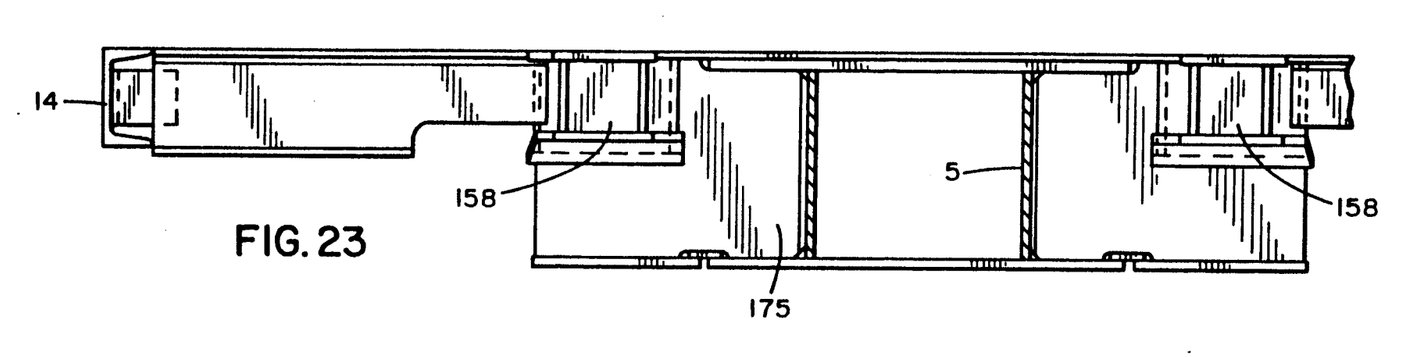
FIG. 23 is a cross-section taken substantially on line 23—23 of FIG. 18.
Figure 24:
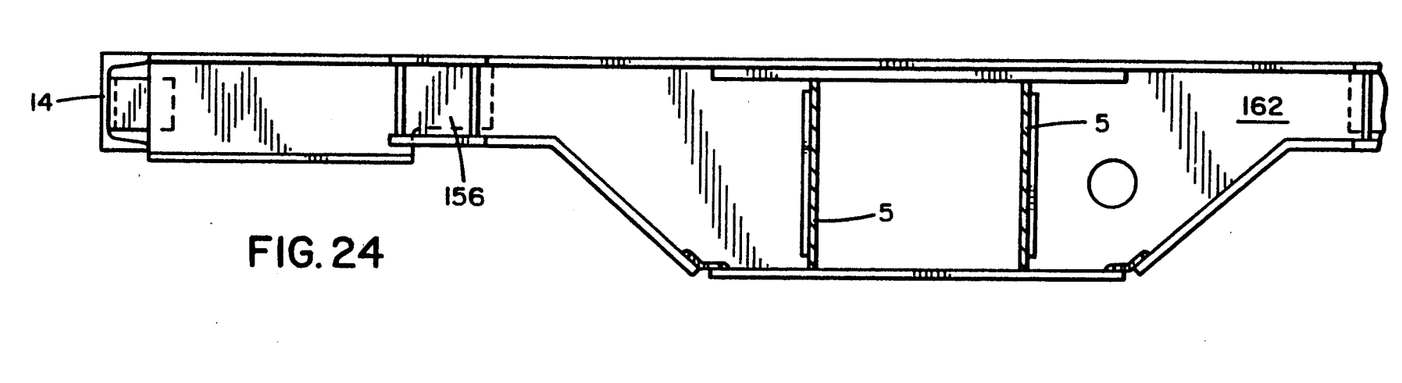
FIG. 24 is a cross-section taken on line 24—24 of FIG. 18.

FIGS. 17, 18, 20 and 21 illustrate an embodiment of a transverse bolster 18 indicated generally at 123a for use at an end of railway car 2 housing coupler 42. Bolster 123a includes locks 140a at each end. Locks 140a are laterally positioned beyond stringer 14 on each side. Lock 140a forms a surface 142a in horizontal alignment with the plane of upper surface 144 of stringers 15. As shown in FIGS. 20 and 21, locks 140a are aligned with the center lines of bolsters 123a. Bolster 123a of FIG. 20 has a vertical plate 162 which is joined at its inner edge 164 to side wall 48 of center sill 5. Top edge 166 of bolster 123a is offset downwardly as at 168. Stringer 15 is mounted to top edge 166 intermediate its ends. An outer end of top edge 166 is connected to side sill 14.

The disposition of the adjacent ends of two railway cars 2 is shown in FIGS. 17, 18, 23, and 24. Bearing arms 156 and 158 are provided on adjacent railway cars 2. Bearing arms 156 and 158 are intercalated with each other such that they cooperate with the truck bolster as explained in the heretofore cited U.S. Patents made part of this application.

Figure 19:
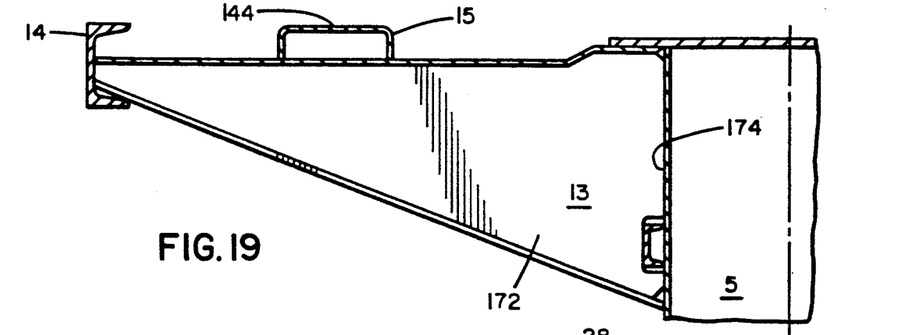
FIG. 19 is a cross-section of a cross member of FIG. 1.

FIG. 19 illustrates an embodiment of cross members 13 of FIG. 1. Intermediate the ends of frame 4, a plurality of cross members 13 of FIG. 19 may be provided as shown in FIG. 1. Cross members 13 may include a vertical plate 172 coupled to center sill 5 at edge 174. Plate 172 may also be coupled to side sill 14 as shown in FIG. 19.

Container 28 is supported on railway car 2 by a plurality of coplanar surfaces. As shown in FIG. 13, 20 and 21, surfaces 142, 142a and 144 provide coplanar surfaces to support container 28. It should be noted that coplanar surfaces 142, 142a and 144 are in an elevated relation to surface 22 of center sill 5. In the areas of connection of container 28 to frame 4 the end portions of bolster 123a have their top and bottom walls formed into a box section with a pair of laterally spaced webs 180 and 182 for increased strength.

Although the present invention has been described in detail, it should be understood that various alterations, substitutions and changes can be made hereto without departing from the spirit and scope of the invention as defined by the appended claims.

What is claimed is:

1. A railway flat car comprising a frame being supported by truck assemblies, said frame being formed by a longitudinal center sill and a pair of side sills mounted on opposite sides of said center sill, said frame having locking means for affixing corners of a lower one of stacked containers to said frame, said locking means having a lower horizontal surface in contact with one of the corners of the lower one of said stacked containers, and said frame includes a longitudinal stringer disposed on each side of said center sill with said longitudinal stringer forming an upper surface being coplanar to said lower surfaces of said locking means.

2. The railway flat car according to claim 1 wherein said frame includes a pair of cross bolster members extending across said frame in contact with said center sill and said side sills and forming an upper surface, said locking means including a plurality of locks being supported on said upper surface of said cross bolster members for securing the lower container adjacent each of its corners.

3. The railway flat car according to claim 2 wherein said locks are supported adjacent each end of said pair of cross bolster members.

4. The railway flat car according to claim 2 wherein said longitudinal stringers are affixed to the top surfaces of said cross bolster members.

5. The railway flat car according to claim 1 wherein said coplanar surfaces are disposed above the plane of the top of the center sill.

* * * * *